(12) United States Patent
Richards

(10) Patent No.: US 8,398,908 B2
(45) Date of Patent: Mar. 19, 2013

(54) PLASTICS PIPE

(75) Inventor: Lawrence Richards, Warwickshire (GB)

(73) Assignee: Radius Systems Limited (GB)

( * ) Notice: Subject to any disclaimer, the term of this patent is extended or adjusted under 35 U.S.C. 154(b) by 103 days.

(21) Appl. No.: 11/719,198

(22) PCT Filed: Dec. 23, 2005

(86) PCT No.: PCT/GB2005/005069
§ 371 (c)(1),
(2), (4) Date: Dec. 26, 2007

(87) PCT Pub. No.: WO2006/067501
PCT Pub. Date: Jun. 29, 2006

(65) Prior Publication Data
US 2008/0237917 A1 Oct. 2, 2008

(51) Int. Cl.
*B29C 47/06* (2006.01)
(52) U.S. Cl. ......... 264/173.16; 264/177.16; 264/177.19; 425/133.1
(58) Field of Classification Search ............... 425/133.1; 264/173.16, 177.16, 177.19
See application file for complete search history.

(56) References Cited

U.S. PATENT DOCUMENTS

| | | | |
|---|---|---|---|
| 3,061,503 A | | 10/1962 | Gould et al. |
| 3,544,673 A | * | 12/1970 | Inskeep et al. .................. 264/235 |
| 3,668,288 A | * | 6/1972 | Takahashi ..................... 264/46.1 |
| 4,247,506 A | * | 1/1981 | Summers ................. 264/177.16 |
| 4,634,844 A | | 1/1987 | Lodder et al. |
| 4,842,305 A | | 6/1989 | Kistenich et al. |
| 4,999,903 A | | 3/1991 | Bujes |
| 5,150,923 A | | 9/1992 | Ohya et al. |
| 5,171,041 A | | 12/1992 | McMillan et al. |

(Continued)

FOREIGN PATENT DOCUMENTS

| | | |
|---|---|---|
| CH | 655986 | 5/1986 |
| DE | 4444097 | 6/1996 |

(Continued)

OTHER PUBLICATIONS

International Search Report for International Application No. PCT/GB2005/005069 dated Apr. 21, 2006; Applicant Uponor Innovation AB.

(Continued)

*Primary Examiner* — Yogendra Gupta
*Assistant Examiner* — John Robitaille
(74) *Attorney, Agent, or Firm* — Sheridan Ross PC

(57) ABSTRACT

A method for the production of a plastics pipe (9) comprising an inner core and an outer removable skin bonded thereto, which method comprises co-extruding molten polymeric materials forming the inner core and the outer removable skin layer from one or more extruder dies, bringing the polymeric materials together and allowing them to solidify, and conditioning the solidified polymeric materials at a temperature and for a time sufficient to influence the adhesion of the outer skin layer to the inner core, such that on cooling the adhesion of the outer skin layer to the inner core is sufficient to prevent substantial undesired relative movement between the skin layer and the core during installation of the pipe (9), but insufficient to prevent the outer skin layer from being clearly removed by peeling, at least at the ends of the pipe (9), and insufficient to cause a substantial reduction in the impact strength of the inner core.

12 Claims, 3 Drawing Sheets

U.S. PATENT DOCUMENTS

| | | | |
|---|---|---|---|
| 5,618,065 A | 4/1997 | Akiyama | |
| 5,685,572 A | 11/1997 | Linton et al. | |
| 6,358,460 B1 * | 3/2002 | Hunt et al. | 264/491 |
| 6,375,226 B1 | 4/2002 | Dickinson et al. | |
| 6,394,502 B1 | 5/2002 | Andersson | |
| 6,406,063 B1 | 6/2002 | Pfeiffer | |
| 6,478,338 B1 | 11/2002 | Dalmolen et al. | |
| 2005/0073145 A1 | 4/2005 | Boudry et al. | |
| 2009/0026756 A1 | 1/2009 | Bowman | |

FOREIGN PATENT DOCUMENTS

| | | |
|---|---|---|
| EP | 0353977 | 2/1990 |
| EP | 0474583 | 3/1992 |
| EP | 0581208 | 2/1994 |
| EP | 0604 907 | 7/1994 |
| EP | 0644031 | 3/1995 |
| GB | 1481227 | 7/1977 |
| GB | 2297137 | 7/1996 |
| GB | 2297138 | 7/1996 |
| GB | 2300456 | 11/1996 |
| GB | 2319496 | 5/1998 |
| GB | 2323556 | 9/1998 |
| GB | 2349928 | 11/2000 |
| GB | 2392220 | 2/2004 |
| GB | 2392221 | 2/2004 |
| JP | 3-24392 | 2/1991 |
| JP | 5-263984 | 10/1993 |
| JP | 05-293870 | 11/1993 |
| JP | 05338060 | 12/1993 |
| JP | 10-220676 | 8/1998 |
| JP | 11-141787 | 5/1999 |
| JP | 11-270771 | 10/1999 |
| WO | WO 93/00212 | 1/1993 |
| WO | WO 98/22744 | 5/1998 |
| WO | WO 2004 016420 | 2/2004 |
| WO | WO 2004/016421 | 2/2004 |
| WO | WO 2004/016976 | 2/2004 |

OTHER PUBLICATIONS

Written Opinion of the International Searching Authority for International Application No. PCT/GB2005/005069; dated Apr. 21, 2006; Applicant Uponor Innovation AB.

International Preliminary Report on Patentability for International (PCT) Patent Application No. PCT/GB2005/005069, mailed Jul. 5, 2007, 10 pages.

* cited by examiner

PLASTICS PIPE

CROSS-REFERENCE TO RELATED APPLICATIONS

This application is a 371(c) National Stage of PCT/GB2005/005069 filed Dec. 23, 2005, which claims priority to United Kingdom patent application Serial No. GB 0428207.5 filed Dec. 23, 2004, the disclosures of which are hereby incorporated by reference in their entireties.

This invention relates to plastics pipes, and more particularly to a novel method and apparatus for manufacturing composite plastics pipes, and plastics pipes manufactured thereby.

BACKGROUND

In the handling, installation and connection of plastics pipes, the pipe surface is easily damaged. In "no-dig" plastics pipe installation techniques, for example, a tunnel is bored in the ground for the pipe and the pipe is then pushed or pulled through the tunnel into an excavated hole where the next pipe joint is to be made. Installation techniques such as pipe-bursting and slip lining can also place extreme stress on the pipe surface.

Other modern pipe laying methods can also subject the pipe to substantial bending and tensile forces, both of which can result in a deterioration of the mechanical strength of the pipe. In addition, the useful life of the pipe may be reduced by diffusible materials in the ground, or by environment conditions, for example, exposure to direct sunlight for long periods.

Of greatest concern, is that modern pipe laying methods can result in the pipe becoming scratched and dirty. This is disadvantageous firstly as the pipe material may be notch sensitive, in which case any scratches may cause greater damage to occur in the pipe during subsequent handling or use. Secondly, dirt and/or oxidation on the pipe surface may prevent successful welding. The main reason for failure of joints using an electrofusion fitting is that the surface of the pipe is dirty or has become oxidised. For this reason, until recently, the pipe ends always have had to be cleaned and scraped before jointing, for example, with a hand or mechanical scraper. In practice, the cleaning and scraping is often uneven (the underside of the pipe in particular may be treated less carefully), and the quality of the end result depends upon the professional skill of the installer.

In recent years there have been proposals to provide the pipe with a non-adherent skin layer which can be removed in order to permit jointing. Pipe constructions of this type are described, for example, in JP3-24392, JP5-263984, EP0474583, EP0604907, GB2323556, GB2300456, and WO93/00212. The entire disclosures of all these patents and applications are incorporated herein by reference for all purposes.

All of these prior art pipe constructions suffer from the disadvantage that modern pipe laying techniques tend to cause wrinkling, rucking, or at least undesired relative movement of the non-adherent skin layer relative to the core when the pipe is pushed through the ground. These proposals have therefore not proved commercially acceptable.

More traditional proposals, wherein a protective skin layer is provided which is strongly adherent to the pipe, do not, of course, overcome the problem of dirt and oxidation on the outer surface, since such skin layers are very difficult to remove without elaborate equipment. The presence of a tightly adherent skin layer can also dramatically lower the impact strength of the plastics pipe.

The first appreciation that the above problems could be solved by using a protective skin layer which is only lightly adherent to the core pipe occurs in GB2297137 and GB2297138, the entire disclosures of which are incorporated herein by reference for all purposes.

In GB2297138, for example, there is provided a plastics pipe which comprises an inner core and an outer protective layer bonded thereto, in which the dimensions of the pipe and the protective layer are such that the ratio of the external diameter of the pipe to the thickness of the protective layer is at least 70, preferably at least 100, and the cohesive strength of the outer protective layer, excluding any lines of weakness, at least at the ends of the pipe, is greater than the strength of the adhesive bond between the outer protective layer and the inner core. According to this specification, by a correct choice of the material of the skin layer and the extrusion conditions, it is possible to provide a level of adhesion which still permits clean removal of the skin layer by peeling, whilst preventing rucking or wrinkling of the skin layer during installation and without substantially adversely affecting the mechanical properties of the pipe.

GB2297137 and GB2297138 do not recommend the use of an adhesive between the skin layer and the core, relying instead on the Van der Waals and/or diffusive bonding between the polymer surfaces.

The composite pipe of UK patents GB2297137 and GB2297138 has been commercially extremely successful, but it has been found that it is difficult to manufacture a composite pipe which, under specific conditions of temperature and loading, has both the required toughness and limited adhesion of the skin layer to the core pipe. Quality control of the base polymer material of the skin layer, and control of the extrusion conditions during manufacture, need to be rigorously maintained if undesirable quantities of scrap are to be avoided This substantially increases both raw material and manufacturing costs.

The above problem has been addressed in various ways. In WO 04/016976 there is provided an outer removable skin layer that comprises at least two layers, a first outer protective layer and a second inner bonding layer. In WO 04/016420 the outer removable skin layer comprises an adhesion modifying additive. In WO 04/016421 the inner core and the outer removable skin layer are chosen such that the Young's modulus of the skin layer is equal to or less than the Young's modulus of the inner core.

Whilst all these methods have been found to provide significant improvements in manufacturing, they add costs and/or complications to the extrusion process and there still remains a need for a simpler and more economic method for the manufacture of a plastics pipe having a removable protective skin layer.

BRIEF SUMMARY OF THE DISCLOSURE

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The present invention provides a method for the manufacture of a plastics pipe having a removable protective skin layer of improved consistency, which includes a conditioning step to influence the adhesion of the outer skin layer to the inner core of the pipe.

In a first aspect the invention provides a method for the production of a plastics pipe comprising an inner core and an outer removable skin bonded thereto, which method comprises co-extruding molten polymeric materials forming the inner core and the outer removable skin layer from one or more extruder dies, bringing the polymeric materials together and allowing them to solidify, and conditioning the solidified polymeric materials at a temperature and for a time sufficient to influence the adhesion of the outer skin layer to the inner core, such that on cooling the adhesion of the outer skin layer to the inner core is sufficient to prevent substantial undesired relative movement between the skin layer and the core during installation of the pipe, but insufficient to prevent the outer skin layer from being cleanly removed by peeling, at least at the ends of the pipe, and insufficient to cause a substantial reduction in the impact strength of the inner core.

In a second aspect the invention provides a plastics pipe produced according to the method of the first aspect of the invention.

In a third aspect the invention provides an apparatus for the production of a plastics pipe comprising an inner core and an outer removable skin bonded thereto, which comprises:

one or more extruders for co-extruding molten polymeric materials comprising the inner core and the outer skin layers;

one or more extrusion dies for bringing together molten streams of the polymeric materials and for forming the inner core and the outer skin layer of the pipe; and conditioning means for receiving the polymeric materials issuing from the one or more extrusion dies adapted to maintain the extruded polymeric materials at a temperature and for a time sufficient to influence the adhesion of the inner core to the outer skin layer, such that on cooling the adhesion of the outer skin layer to the inner core is sufficient to prevent substantial undesired relative movement between the skin layer and the core during installation of the pipe, but insufficient to prevent the outer skin layer from being cleanly removed by peeling, at least at the ends of the pipe, and insufficient to cause a substantial reduction in the impact strength of the inner core.

In a further aspect, the invention provides a method of making a joint to a plastics pipe according to the second aspect of the invention, or of joining two such plastics pipes, which comprises peeling the skin layer from the region or regions of the pipe to be joined, to expose a clean surface suitable for electrofusion jointing, installing an electrofusion fitting over the clean surface or surfaces of the pipe or pipes and activating the electrofusion fitting to fuse the region or regions of the pipe or pipes thereto.

By "conditioning" in the present specification is meant a thermal treatment in which the normal cooling rate in air of the extruded pipe is arrested or slowed, or in which the extruded pipe is allowed to cool and then re-heated and cooled. Such thermal treatments can include, for example, one or more heating cycles alternating with cooling. In general the thermal treatment will usually include heating or re-heating at least the surface of the pipe to increase its surface-temperature and the temperature of the bond-line between the skin layer and the inner core.

In certain instances, however, the thermal treatment could involve insulating the hot extruded pipe such that its normal cooling rate in air is prolonged sufficiently to influence the adhesion of the outer skin layer to the inner core.

By "influence the adhesion of the inner core to the outer core skin layer" in the specification is meant that the conditioning changes the strength of the adhesion bond between the inner core and the skin, normally by reducing it, or by improving the uniformity of the adhesive bond, or both.

Without wishing to be bound to any particular theory, it is believed that the adhesion between the high molecular weight polymers of the skin layer and the core is as a result of Van der Waals and/or diffusive bonding, or similar forces. The effect of the conditioning method of the present invention may be to reduce or unify, but not eliminate, one or more of these forces, by an annealing of the bond-line, or by differential expansion between the skin layer and the core. It can be seen that the effect is completely different from that obtained by, for example, cooling the skin layer before bringing the skin layer and the inner core together, which merely results in a pipe with a non-bonded skin layer.

By "undesired relative movement" in this specification is meant movement or de-bonding of the skin layer relative to the core during directional drilling, pipe bursting, slip lining or other conventional pipe installation procedures.

The strength of the adhesive bond between the skin layer and the inner core is preferably at least 0.1 N/mm, more preferably at least 0.2 N/mm, when measured by a rolling drum peel test as described in Appendix 1. The adhesive bond between the skin layer and the inner core is preferably less than 2.0 N/mm, more preferably less than 1.5 N/mm. Very good results have been achieved using an adhesion between the skin layer and the inner core within the range of from 0.3 to 1.5 N/mm, when measured by the above-mentioned rolling drum peel test.

It is likely that any adhesion between the skin layer and the inner core will have some effect upon the impact strength of the plastics pipe, and it is presumably for this reason that prior art proposals (other than GB2297137 and GB2297138) have always sought to avoid adhesion between the skin layer and the core. Nevertheless, it has been found that the combination of the tough outer protective layer and the light bonding used in the present invention can still produce a plastics pipe having sufficient impact strength to meet the requirements of all available standards and moreover improved impact strength over the products of GB2297137 and GB2297138. Preferably the strength of the adhesive bond between the skin layer and the inner core is such that the impact strength of the composite pipe is at least 50%, preferably at least 75%, more preferably at least 90% of the impact strength of the inner core without the skin layer.

Each of the layers of the composite plastics pipe of the present invention can comprise any suitable thermoplastic polymeric material, consistent with the maintenance of the required properties. Suitable polymeric materials include, for example, olefinically-unsaturated polymers and co-polymers, for example, polyolefins such as polyethylene, polypropylene, polybutene and polybutylene; ethylene and propylene co-polymers, for example, ethylene-vinyl acetate polymers, and propylene-vinyl acetate polymers; halogenated-vinyl polymers such as vinyl chloride polymers and co-polymers;

polyamides, for example, nylon 6, nylon 11, nylon 12 and nylon 66; polycarbonates; ABS polymers and ionomer polymers such as Surlyn®.

The inner core of the pipe comprises a polymeric material chosen to be compatible with the particular application, and in particular with the fluid material to be conveyed by the pipe. For many applications polyethylene is the preferred material for the inner core. The grade of polyethylene chosen, that is to say, high density, medium density, low density, or linear low density, will depend upon the particular application. Suitable grades of polyethylene for pressure pipe applications preferably meet the requirements of at least one of prEN 12201-1 (except clause 4.2.1 and the associated pigment or carbon black requirements if the PE material is unpigmented), prEN12201-2 (except clause 5.2 and the associated pigment or carbon black requirements if the PE material is unpigmented), prEN1555-1 (except clause 4.2.2 and the associated pigment or carbon black requirements if the PE material is unpigmented) and prEN1555-2 (except clause 5.2 and the associated pigment or carbon black requirements if the PE material is unpigmented).

Any suitable equivalent grade of polyethylene may, of course, also be used.

The removable skin layer is preferably formed from a polymeric material or a blend of polymeric materials having good mechanical and physical properties, especially toughness and low temperature impact strength, together with an ability to receive quantities of stabilising materials, in particular UV stabilisers, sufficient to protect the underlying layer(s) and the inner core. Preferably the skin layer has a notched Charpy impact strength of at least 1 kJ/m$^2$, more preferably at least 2 kJ/m$^2$ and most preferably at least 4 kJ/m$^2$, when measured using the method of ISO 179/16A at a temperature of −20° C.

Preferred polymeric materials for the outer skin layer comprise propylene homo- and co-polymers, propylene block co-polymers, and propylene random co-polymers.

An advantage of the plastics pipes of the present invention is that the normal UV stabiliser and colorant package need not be included in the plastics material of the inner core, provided that sufficient quantities of these materials are included in the outer protective layer. This enables the inner core to comprise a natural polymeric material, free or substantially free from additives which add to the cost of the core material and which, in certain circumstances, may impair the mechanical or physical properties of the core material. Alternatively, stabilisers can be included in the core material, but the outer protective skin layer can be coloured to indicate the fluid being transported within the pipe.

Suitable stabiliser or ultra-violet blocking additives include, for example, titanium dioxide, carbon black, and other fillers. Whilst carbon black is an excellent UV stabiliser and reinforcing filler, buried pipes are frequently colour coded and its use in the outer protective layer is therefore not possible for many applications. Titanium dioxide is, therefore, the preferred filler and UV stabiliser since this is also compatible with many colorant packages. Other filler materials such as chalk and talc, may also be used. The preferred filler particle size is dependent on the filler being used, but for titanium dioxide, for example, the average particle size range is preferable from 0.003 to 0.025 microns.

The adhesive properties of the inner bonding layer could be further modified, for example, by the addition of an adhesion modifying agent such as a glycerol ester, as described in WO 04/016420.

A particularly preferred plastics pipe produced according to the method of the present invention comprises an inner core of polyethylene and a skin comprising an outer layer of a propylene block co-polymer. It will be appreciated by those skilled in the art that a pipe having a polyethylene core and a propylene block co-polymer skin layer will normally have a skin layer that is tightly adherent to the core. The method of the present invention can enable a lower, consistent skin adhesion to be obtained such that the skin can readily be peeled from the core at room temperature Preferably the impact strength of a 90 mm outside diameter plastics pipe having a polyethylene inner core and a polypropylene skin layer with an SDR of 17.0 produced according to the method of the invention is greater than 300 joules when measured using the method of EN1411:1996 at a temperature of −10° C. using a 90 mm diameter striker (tup) for impacting the pipe.

The skin layer can, of course, comprise more than one layer of polymeric material, for example, as described in WO 04/016976.

The relative thickness of the skin layer and the dimensions of the pipe have also been found to affect the impact resistance of the pipe. This is discussed in GB 2297138. Preferably the total skin layer has a thickness of greater than 0.1 mm, more preferably greater than 0.2 mm, and most preferably within the range of from about 0.3 mm to 2.0 mm.

The dimensions of the pipe and the protective skin layer are preferably such that the ratio of the external diameter of the pipe to the thickness of the skin layer is at least 70, more preferably at least 100, most preferably in the range 150 to 800. From this it can be seen that it is possible to use a thicker protective skin layer on a pipe of greater diameter.

When stripping the skin layer from the pipe, it is important that no residue or holidays should be left on the pipe surface that could interfere with the electrofusion jointing process. Thus conventional adhesives and skin layers that are prone to tearing or fragmentation should be avoided. In general the force required to rupture the skin layer should be greater than the force required to peel the skin layer from the inner core.

By "a clean surface" in this specification is meant a pipe surface that can be subjected to electrofusion jointing without further preparation or treatment. Such surfaces should be clean such that the electrofusion joint formed to them meets the requirements of one or more of pr EN12201 part 3, pr EN1555 part 3 and WIS 04-32-14.

In the co-extrusion method of the present invention the polymeric materials are preferably brought together whilst still molten in the pressure area of the die and exit as a single extrudate. For example, the die may be connected to one, two, three or more extruders and fed with separate streams of molten material; Alternatively, the die may be provided with concentric die outlets fed with separate streams of molten polymeric materials which are to form the inner core and the skin layer. In this case, the extrudates, on leaving the extruder die outlets, are preferably be brought into contact with each other whilst still molten, preferably in a sizing die which simultaneously adjusts the outer diameter of the pipe.

In a further alternative, the inner core may be passed through a sizing die before applying the skin layer. In this case it may be necessary to re-heat or flame-brush the surface of the inner core to create a surface ready to receive the skin layer. Because of the difficulty of maintaining a consistent adhesion between the inner core and the skin layer, and of keeping the core surface clean (prior to coating with the skin) this method is not presently preferred.

Preferably the method of the invention is carried out in-line, that is to say, the conditioning means is included in the extrusion line apparatus.

In accordance with the method of the present invention, after the polymeric materials of the skin layer and the core have been brought together they are allowed to cool and solidify. The cooling may be in air, or the extruded pipe may be cooled by cooling means, for example, by water sprays or by passing through a cooling bath.

When the method is carried out in-line, it will usually only be necessary to cool the extruded pipe to a temperature at which it is self-supporting and can be handled without sagging, that is to say, to a temperature of from 10 to 100° C., preferably from 5 to 30° C. below the solidification temperature of the polymeric material forming the inner core.

In accordance with the method of the invention the extruded composite pipe is then conditioned at a temperature and for a time sufficient to influence the adhesion of the inner core to the outer skin layer. The conditioning may take various forms. At its simplest, it may comprise merely maintaining the extruded pipe at a predetermined temperature range for a time sufficient to influence the adhesion of the inner core to the outer skin layer. This can be achieved by passing the extruded pipe through a tunnel lined with insulating material such that the cooling of the extruded pipe is arrested or slowed. Preferably, however, external heat is applied to the extruded pipe, for example, by passing the pipe through an oven, or by the use of one or more radiant heaters. Alternatively the pipe may be heated by microwave heaters provided that the skin layer and/or the core layer comprise appropriate microwave-susceptible additives. In most cases the heat applied need only be sufficient to raise the temperature of the skin layer and the bond-line between the skin layer and the inner core.

Preferably the extruded pipe is heated in the conditioning step such that its outer surface temperature is from 30 to 150° C., more preferably from 40 to 100° C., most preferably from 70 to 90° C. Preferably the outer surface temperature is maintained for a period of from 250 to 5 seconds, more preferably from 100 to 6 seconds, most preferably from 60 to 10 seconds.

When, as in the preferred method of the invention, the conditioning step is carried out in-line, the line speed can be from 0.001 to 0.4 m/s and the length of the conditioning means is preferably from 0.25 to 2 m.

After the conditioning step the extruded pipe is allowed to cool to ambient temperature whereupon it can be coiled or cut to length as appropriate.

BRIEF DESCRIPTION OF THE DRAWINGS

An embodiment of an extrusion apparatus in accordance with the invention is illustrated, by way of example only, in FIG. 1 of the accompanying drawing.

DETAILED DESCRIPTION

Figure 1:
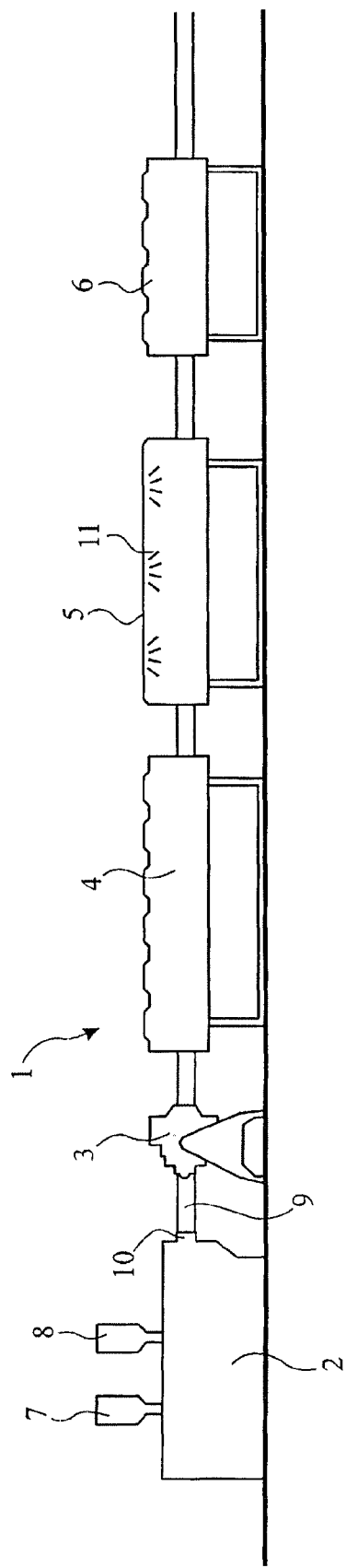

Referring to FIG. 1, there is shown an extrusion line illustrated generally at 1, which comprises an extruder 2, a sizing die 3, a first cooling bath 4, a conditioning oven 5 and a second cooling bath 6. Polymeric materials for the inner core and the outer skin of the pipe are loaded into extruder hoppers 7, 8 and the extruded pipe 9 issues from the extruder die 10. The pipe 9 passes through a sizing die 3 and into a first water cooling bath 4. The pipe enters the conditioning oven 5 and is exposed to radiant heaters 11, which raise the surface temperature of the pipe. Finally the conditioned pipe passes through a second water cooling bath 6.

The invention is illustrated by the following Example:

EXAMPLE

A polyethylene core pipe of nominal outer diameter 90 mm is co-extruded with a propylene block copolymer skin layer using the apparatus of FIG. 1. The pipe enters the conditioning oven 5 at a temperature of from 20 to 40° C. wherein its surface temperature is raised to from 70 to 90° C. The line speed is 0.5 m/s and the conditioning oven is 1 m in length, thus the conditioning time is 20 seconds. The experiment is repeated with the same polymeric materials but omitting the conditioning step.

Skin adhesion is measured using a rolling drum peel test as described in Appendix 1.

The skin layer of the conditioned pipe can be peeled readily at ambient temperature using a simple hand tool, exposing a clean surface of the core pipe. Electrofusion jointing tests give very good results in conformance with prEN12201 part 3, prEN1555 part 3 and WIS 04-32-14. In the comparison experiment where the conditioning step is omitted the skin layer firmly adheres to the core pipe and cannot be removed from the pipe by peeling.

The impact strength of the pipes, with and without conditioning, is measured at −10° C., using the method of EN 1411:1996. In further experiments the pipes are notched at 90° to the point of impact prior to testing to simulate service conditions. It is observed that pipes without conditioning have consistently lower impact strengths than pipes that have been conditioned in accordance with the invention.

The reader's attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent, or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

APPENDIX 1

Determination of the Adhesion Strength of Pipe Skin to Core—Peel Strength

Apparatus

A tensile testing machine accurate to grade A of BS5214: Part 1: 1975 or grade 1 of BS1610: Part 1: 1985, for example, a Lloyds tensile test machine, using a 100N load cell.

Test Specimens

Two test pieces are cut one from each end of the sample pipe, 25 mm±2 mm wide, the two sample rings of pipe are trimmed around the circumference to remove the jagged edge. The pipe is marked along top dead centre (TDC) of the extrusion line (if known).

Figure 2:
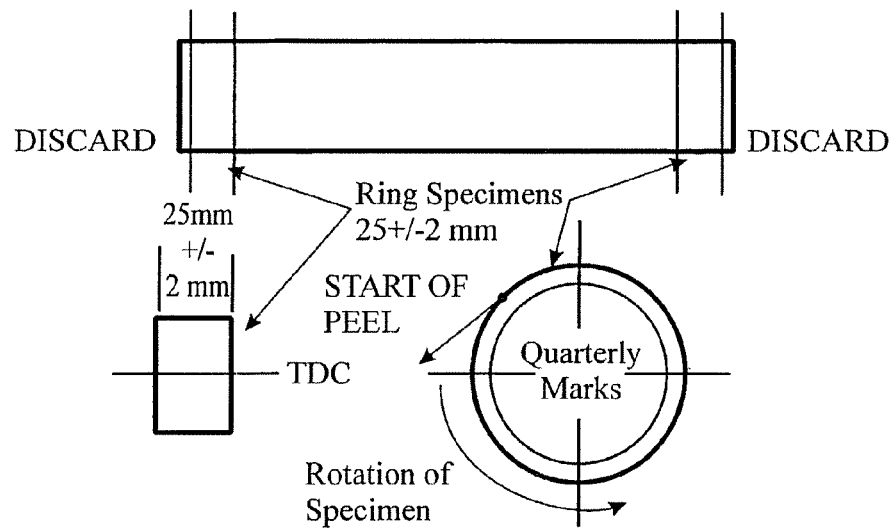
FIG. 2 illustrates the ring specimens (test pieces) used in the test of Appendix 1.

The two ring specimens are marked with an indelible marker at quarterly points around the circumference beginning at TDC (if known), as shown in FIG. 2.

Procedure

Cut through the skin along mark at TDC & prise edge of skin from pipe, peel skin off to 30-40 mm length, feed peeled skin through the jig as shown & clamp in upper jaws.

Figures 3, 3A:
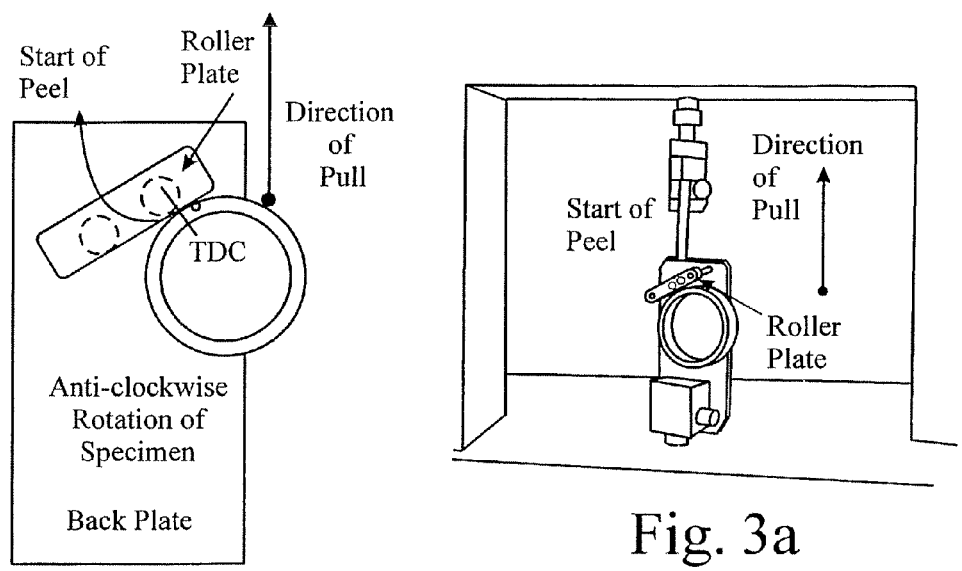
FIGS. 3 and 3a illustrate how a test piece should be mounted in a jig.

Mount the test piece in the jig as shown in FIGS. 3 and 3a.

The skin is then peeled from the pipe at a separation rate of 100 mm/min and a trace recorded of load versus time.

The average value of the load required to peel the skin sample is calculated (Newtons), and divided by the true width of the peel sample to obtain the test result (Newtons/millimeter).

The invention claimed is:

1. A method for the production of a plastics pipe comprising an inner core, which is comprised of polyethylene, and an outer removable skin layer bonded thereto, which is comprised of propylene homo- or co-polymer, or propylene block co-polymer, wherein the outer removable skin layer has a thickness within the range of from 0.3 mm to 2.0 mm, which method comprises co-extruding molten polymeric materials forming the inner core and the outer removable skin layer from one or more extruder dies, bringing the polymeric materials together and allowing them to solidify, and conditioning the solidified polymeric materials, by heating externally the extruded pipe with the external heat applied being sufficient to raise a temperature of the skin layer and a bond-line between the skin layer and the inner core such that an outer surface temperature of the extruded pipe is from about 40°-100° C., and wherein the outer surface temperature of the extruded pipe is maintained for a period of from about 6 to 100 seconds, at a temperature and for a time sufficient to influence the adhesion of the outer skin layer to the inner core, such that on cooling the adhesion of the outer skin layer to the inner core is sufficient to prevent substantial undesired relative movement between the skin layer and the core during installation of the pipe, but insufficient to prevent the outer skin layer from being cleanly removed by peeling, at least at the ends of the pipe, and insufficient to cause a substantial reduction in the impact strength of the inner core.

2. A method according to claim 1, wherein on cooling the adhesion between the outer skin layer and the inner core is from 0.3 to 1.5 N/mm when measured by a rolling drum peel test using a tensile testing machine accurate to at least one of a grade A of BS 5214: Part 1: 1975 and grade 1 of BS 1610: Part 1: 1985, in which a ring specimen 25 mm wide +/−2 mm is cut from a pipe end and then cut in an axial direction and peeled to peel off 30-40 mm of pipe skin which is then attached to the testing machine, the testing machine being operated such that the skin is peeled from the pipe at a separation rate of 100 mm/min while a trace of the load required against time is recorded.

3. A method according to claim 1, in which the inner core comprises polyethylene and the skin layer comprises a propylene copolymer and wherein the impact strength of the pipe on cooling is greater than 300 joules, when measured using the method of EN1411:1996 at a temperature of −10° C. using a 90 mm striker for impacting the pipe.

4. A method according to claim 1, wherein the polymeric materials of the inner core and the outer removable skin layer are co-extruded simultaneously and brought together while still molten.

5. A method according to claim 1, wherein the extruded polymeric materials are brought into contact with each other in a sizing die which simultaneously adjusts the outer diameter of the pipe.

6. A method according to claim 1, which is carried out in-line.

7. A method according to claim 1, wherein the extruded pipe is brought to a temperature of from 10 to 100° C. below the solidification temperature of the polymeric material forming the inner core before conditioning.

8. A method according to claim 1, wherein the conditioning step comprises maintaining the extruded pipe at a predetermined temperature range for a time sufficient to influence the adhesion of the inner core to the outer skin layer.

9. A method according to claim 8, wherein the extruded pipe is passed through a tunnel lined with insulating material such that the cooling of the extruded pipe is arrested or slowed.

10. A method according to claim 1, wherein the external heat is applied by passing the pipe through an oven, or by the use of radiant heaters, or by the use of microwave heaters.

11. A method according to claim 1, wherein there is used an apparatus comprising a pipe having an inner core and an outer removable skin bonded thereto, which comprises: one or more extruders for co-extruding molten polymeric materials comprising the inner core and the outer skin layers; one or more extrusion dies for bringing together molten streams of the polymeric materials and for forming the inner core and the outer skin layer of the pipe; and conditioning means for receiving the polymeric materials issuing from the one or more extrusion dies adapted to apply external heat being sufficient to raise a temperature of the skin layer and a bond-line between the skin layer and the inner core such that the extruded pipe is maintained at a temperature and for a time sufficient to influence the adhesion of the inner core to the outer skin layer, such that on cooling the adhesion of the outer skin layer to the inner core is sufficient to prevent substantial undesired relative movement between the skin layer and the core during installation of the pipe, but insufficient to prevent the outer skin layer from being clearly removed by peeling, at least at the ends of the pipe, and insufficient to cause a substantial reduction in the impact strength of the inner core.

12. A method according to claim 11, wherein the conditioning step is carried out in-line, the line speed is from 0.001 to 0.4 m/s and the length of the conditioning means is from 0.25 to 2 m.

* * * * *